United States Patent [19]

Sugisawa et al.

[11] Patent Number: 4,678,677
[45] Date of Patent: Jul. 7, 1987

[54] PROCESS FOR PREPARING TOFU CHARGED INTO A CONTAINER

[75] Inventors: Ko Sugisawa; Yasushi Matsumura; Koji Sengoku; Yoshiaki Nagatome, all of Nara, Japan

[73] Assignee: House Food Industrial Company Limited, Higashiosaka, Japan

[21] Appl. No.: 740,414

[22] Filed: Jun. 3, 1985

[30] Foreign Application Priority Data

Jul. 4, 1984 [JP] Japan ................................ 59-138481

[51] Int. Cl.$^4$ .............................. A23L 1/20; A23J 3/00
[52] U.S. Cl. ..................................... 426/634; 426/598; 426/656
[58] Field of Search ........................ 426/598, 634, 656

[56] References Cited

U.S. PATENT DOCUMENTS 4,514,433 4/1985 Matsuura ............................ 426/634
4,537,789 8/1985 Sugisawa et al. ................... 426/634

FOREIGN PATENT DOCUMENTS 0142590 5/1985 European Pat. Off. ............ 426/634
56-39866 9/1981 Japan .

*Primary Examiner*—Joseph Golian
*Attorney, Agent, or Firm*—Oblon, Fisher, Spivak, McClelland & Maier

[57] ABSTRACT

This invention provides a process for preparing tofu charged into a container, characterized in that homogenizing treatment is conducted within 30 minutes after coagulant is added to soybean milk, and the soybean milk thus prepared is coagulated by heating after the mixture is charged into a packaging container. As effective delayed coagulation effect can be achieved according to such process, the process can be easily applied industrially. The tofu thus prepared is of good texture, has a good taste and is high in quality.

4 Claims, No Drawings

PROCESS FOR PREPARING TOFU CHARGED INTO A CONTAINER

BACKGROUND OF THE INVENTION

1. Field of the Invention

The present invention relates to a process for preparing tofu charged into a container, that is useful for preparing what is called "charged Tofu" or "packed Tofu" of the type prepared by the coagulation of soybean milk by heating after soybean milk including a coagulant etc. have been charged into a container and sealed therein. More particularly, the present invention relates to a new effective process for preparing tofu charged into a container when a rapid-acting coagulant such as magnesium chloride is used.

2. Description of the Prior Art

In the preparation of charged tofu, much effort has gone into realizing delayed coagulation reaction so as to avoid the trouble caused by rising viscosity of the soybean milk in the step of transferring the soybean milk including a coagulant to the packaging container to charge it therein, the step of charging it into a packaging container and other steps.

Therefore, there is generally used a delayed-acting coagulant such as δ-gluconic lactone (hereafter referred to as G.D.L) which can act slowly as a coagulant in the soybean milk. However, when such a delayed-acting coagulant is used, it is necessary to bring the temperature of the soybean milk down to near room temperature. Moreover, it is generally agreed that tofu prepared by using G.D.L. is less tasty than tofu prepared by using magnesium chloride.

On the other hand, when a rapid-acting coagulant such as magnesium chloride, calcium sulfate etc. is used for preparing tofu, it is known to delay coagulation by using a polyphosphate as a coagulation delaying agent together with said rapid-acting coagulant. But since the coagulation reaction can only be delayed for 1 to 2 minutes by said method, the viscosity of the soybean milk rises after said time and therefore, trouble occurs in the charging procedure.

Furthermore, according to the process described above, it is observed that the tofu thus produced loses water, which degrades the quality of the Tofu in that it does not have a smooth texture to the tongue.

It is considered that a major cause for this is that the soybean milk is first partially coagulated by the coagulation reaction, the soybean milk thus coagulated is broken during the transferring step, charging step etc., and further coagulation thereafter proceeds by heating.

SUMMARY OF THE INVENTION

Under such circumstances, the inventors conducted exhaustive studies toward the solution of these numerous problems in the conventional process for preparing tofu charged into a container and found that homogenizing the mixture within 30 minutes after adding the coagulant to the soybean milk makes it possible to obtain an effective delayed coagulation effect, to prevent removal of the water included in the tofu and to obtain charged tofu having a good taste. This is presumed to be because the homogenizing treatment acts on the protein particles starting to grow in the soybean milk to reduce their particle size and inhibit growth thereof Furthermore, according to another aspect of the invention, the inventors found that the delayed coagulation effect described above is more effectively achieved by a procedure in which the mixture is homogenized after the coagulant and a coagulation delayed agent are added to the soybean milk. By this procedure the coagulation of the soybean milk can be inhibited for a long time, making it possible to obtain, charged tofu of good quality.

Although the inventors feel that theoretical considerations are of secondary importance, they presume that the effect of this procedure derives from the fact that in addition to the coagulation reaction of the soybean milk being inhibited by the chelate action of the coagulation delaying agent used in the present invention, the growth of the protein particles is prevented by the homogenizing treatment.

The principal object of this invention is to provide a new process for preparing tofu charged into a container wherein sufficient delayed coagulation effect can be obtained and troubles caused by rising viscosity of the soybean milk in the transferring step, charging step etc. can be avoided when a coagulant, even a rapid-acting coagulant, is added to the soybean milk.

Another object of this invention is to provide a process for preparing tofu charged into a container having good taste and good texture without removal of the water included in the tofu.

Another object of this invention is to provide a simple process for preparing such tofu that can be easily applied industrially.

These and other objects of this invention will be clear from the following description.

DESCRIPTION OF THE PREFERRED EMBODIMENTS

In the process of this invention, soybean milk prepared by conventional methods is preferably used as a starting material. For example, whole soybean, dehulled soybean or defatted soybean is used as a starting material and it is treated according to the following series of processes: starting material→immersion in water (not conducted in the case of defatted soybean)-→addition of water→grinding (to form a slurry called "go")→heating→isolation of soybean lees→soybean milk.

In said process, it is desirable to apply heat treatment to the "go", such as boiling, for about 30 seconds to 10 minutes at a temperature of about 80° to 100° C. Such heating is desirable for the reason that it causes a moderate denaturation of the soybean protein whereby the water retention of the final tofu can be enhanced and the tofu becomes agreeable to the palate.

However, if desired, the heating process may be omitted and the "go" can be directly subjected to the separation process to form soybean milk.

It is possible in the process of this invention to use powdered soybean milk prepared by subjecting soybean milk prepared as described above to a spray-drying technique or the like. In this case, the powdered soybean milk is preferably used in the form of a solution prepared by dispersing and dissolving it into either cold or hot water.

In the process of this invention, as another type of starting material, there can be used an aqueous solution of isolated soybean protein instead of said soybean milk. The aqueous solution of the isolated soybean milk can be obtained by a conventional process which comprises, for example, adding a precipitant such as an acid to soybean milk to precipitate soybean protein and then redispersing and redissolving the precipitate in water.

The dry solids concentration in the soybean milk or the aqueous solution of isolated soybean protein (which are collectively called "soybean milk etc." hereunder) used in the process of this invention is not particularly limited.

The standard (but nonlimitative) dry solids concentration of soybean milk is in the range of about 8 to 15%, preferably about 10 to 13% relative to the weight of the soybean milk. It is desirable to use soybean milk having said dry solids concentration to obtain better delayed coagulation effect. The standard (but nonlimitative) dry solids concentration in the aqueous solution of isolated soybean protein, at which better delayed coagulation effect is obtained, is in the range of about 3 to 8%, preferably about 4.5 to 7% relative to the weight of the aqueous solution of isolated soybean protein.

In the process of this invention, a coagulant is added to the soybean milk etc. The coagulant can be added in a conventional manner, i.e., powder of the coagulant can be directly mixed with the soybean milk etc. or an aqueous solution of the coagulant can be added to the soybean milk etc.

The coagulant used in this invention can be of any type, including the delayed-acting type and the rapid-acting type. Namely, any kind of coagulant can be used. Moreover, the amount of the coagulant is not limited.

Thus, the kind and amount of coagulant can be suitably selected according to the desired hardness of the tofu to be prepared, the dry solids concentration of the soybean milk used, etc. For example G.D.L, which is a delayed-acting coagulant, is used in the standard amount of about 0.15 to 0.5% relative to the weight of the soybean milk etc. preferably about 0.2 to 0.35%, to obtain tofu having good taste and good texture.

If magnesium chloride, which is one of the rapid-acting coagulants, is used as the coagulant it is preferably used in an amount of about 0.3 to 0.8% (relative to the weight of the soybean milk etc.), and if calcium sulfate, which also of the rapid-acting type, is used as the coagulant, it is preferably used in an amount of about 0.2 to 0.6%. Magnesium chloride or calcium sulfate can be used together with G.D.L.

In the process of this invention, when said coagulant is added to the soybean milk etc., it is preferable in advance to adjust the temperature of the soybean milk etc. to between about 0° and 25° C., more preferably between 5° and 10° C., to obtain sufficient delayed coagulation effect by this invention and improve the taste of the tofu thus prepared.

In one aspect of the present invention, a coagulation delaying agent is added to the soybean milk etc. at same time as, before or after the coagulant is added, whereby the delayed coagulation effect can be improved. Especially great effect can be obtained by said method when said rapid-acting coagulant is used.

In the process of this invention, as a delayed coagulating agent, there may be mentioned, for example, polyphosphate such as sodium pyrophosphate, sodium hexametaphosphate and sodium polyphosphate. These polyphosphates can be used singly or in combination. The polyphosphate is preferably used in an amount (total amount thereof if more than one kind of polyphosphate is used) of 0.05 to 0.4% (relative to the weight of the soybean milk etc.), more preferably 0.2 to 0.3% in order to obtain tofu having good taste and to realize sufficient delayed coagulation effect.

In the process of the invention, a coagulation delaying agent can be added to the soybean milk etc. at the same time as, before, or after the coagulant is added to the soybean milk etc. However, it is desirable to add the coagulation delaying agent together with the coagulant to soybean milk etc. in order to obtain more effective coagulation delaying effect. Especially, it is most preferable to add a mixture of the coagulant and the coagulation delaying agent prepared in advance to the soybean milk etc. This is considered because, as the coagulation delaying agent and the coagulant are closely and directly mixed, formation of the chelate compound is further increased thereby, and therefore the action of the coagulant on the protein in the soybean milk etc. is more effectively inhibited.

In the process of this invention, soybean milk etc. in which the coagulant or the coagulant and the delayed coagulating agent have been added is then subjected to homogenizing treatment.

In the process of the present invention, it is necessary for the homogenizing treatment to be conducted within in a short period after the coagulant is added to the soybean milk etc. Protein particles in the process of coagulation in the soybean milk etc. can only be broken down and desired delayed coagulation effect achieved by conducting the homogenizing treatment at this time.

On the other hand, in all conventional processes any homogenizing treatment carried out on the soybean milk etc. is conducted before the coagulant is added to the soybean milk etc. Accordingly, protein particles in the process of coagulation cannot be broken down by the conventional process in the way they can be the process of the present invention and, therefore, delayed coagulation effect cannot be expected in the conventional processes.

In the process of this invention, homogenizing treatment may be conducted by a conventional process which comprises using, for example, a pressure type homogenizer such as a high pressure homogenizer or an impact cell mill, a rolling type homogenizer such as a colloid mill, an ultrasonic type homogenizer, etc.

In the process of this invention, it is preferable to use a high pressure homogenizer. In this case, it is necessary to conduct homogenizing treatment under a pressure of no less than 30 kg/cm$^2$, and the homogenizing treatment is preferably conducted under a pressure of about 50 to 700 kg/cm$^2$, more preferably about 100 to 300 kg/cm$^2$ to obtain sufficient delayed coagulation effect and tofu having good texture and good taste. Said homogenizing treatment can be conducted at one time or it may be repeated from 2 to 3 times.

In the process of this invention, it is necessary for the homogenizing treatment to be conducted within 30 minutes after the coagulant is added to the soybean milk etc. in order to achieve the delayed coagulating effect of this invention. Preferably it is conducted between 2 seconds and 10 minutes after the addition of the coagulant in order to further enhance the delayed coagulating effect and obtain better tasting tofu.

In the next step of the process of this invention, the soybean milk etc. to which said coagulant has been added is, by a conventional process, charged into a packaging container, sealed therein and then coagulated by heating to obtain the tofu of this invention.

Any known packaging container can be used in this invention. However, it is preferable to use one made of a heat-resistant material. There are no limits on the shape and size of the packaging container.

In the process of this invention, said coagulation treatment by heating may be carried out by a conventional process. For example, it can be carried out by a treatment such as sterilization with hot water or high temperature-high pressure treatment in a retort.

The conditions of the coagulation treatment by heating can be selected freely in accordance with the kind of coagulant used or the desired degree of product storability. However, the standard heat treatment conditions are a temperature of about 80° to 135° C. and a treatment time of about 5 to 90 minutes.

Generally speaking, when a coagulant which has a low coagulating temperature such as magnesium chloride is employed, there is increased generation of voids known as "su" within the tofu when the soybean milk is rapidly heated to a high temperature. Accordingly, it is desirable to increase the temperature gradually.

As will be clear from the following, tofu having the desired quality can be prepared by the process of this invention.

In the tofu prepared as decribed above, when the soybean milk etc. is heated, coagulation thereof starts and proceeds moderately under the delayed coagulation effect. Accordingly, hardly any of the water included in the tofu prepared according to the process of the present invention is extracted therefrom and, the tofu is smooth to the palate, has good taste and is high in quality.

The present invention will now be illustrated more concretely by referring to the following nonlimitative examples together with comparative examples.

EXAMPLE 1

Whole soybeans were soaked in water and ground after addition of water. The resulting "go" was subjected to steaming treatment and then centrifugal separation to remove the soybean lees. As a result, 3 kg of soybean milk having a dry solids concentration of 10.6% was obtained. The soybean milk was cooled to 10° C.

16.5 g of magnesium chloride (0.55% relative to the weight of the soybean milk) as a coagulant was then added to the soybean milk and mixed therewith. Ten minutes later the mixture was homogenized at a pressure of 150 kg/cm² by a homogenizer. Thereafter the mixture was charged into heat-resistant plastic containers in amounts of 350 g each and sealed therein. The mixture was then coagulated by heating in hot water of 85° C. for 60 minutes and tofu charged into containers was obtained (Samples A to C).

Comparative Example 1

This example was carried out by the same procedures as set forth in Example 1 except that homogenizing treatment was not conducted, whereby tofu charged into a container was obtained as a comparative example (Sample D).

Comparative Example 2

This example was carried out by the same procedures as set forth in Example 1 except that soybean milk which had been cooled was homogenized and then the coagulant was added to the soybean milk, whereby tofu charged into a container was obtained as a comparative example (Sample E).

The viscosity and the results of sensory tests for the samples obtained above are shown in Table I.

By "elasped time" in Table I is meant the time in minutes between carrying out of the homogenizing treatment following addition of the coagulant to the soybean milk and the charging of the mixture into a container. The viscosity of the soybean milk was measured at the elapsed time, i.e., just before the soybean milk was charged into a container, at 10° C. and 60 rpm by a B-type viscometer (rotary bob No. 3) manufactured by Tokyo Keiki Co., Ltd.

TABLE I

| | Sample | elapsed time (minutes) | viscosity (C.P.) | result of sensory test |
|---|---|---|---|---|
| A | Present invention | 1 | 76 | smooth to the palate, water included in tofu not removed, springy |
| B | Present invention | 3 | 148 | smooth to the palate, water included in tofu not removed, springy |
| C | Present invention | 5 | 234 | more or less brittle to the palate, little water removed from tofu |
| D | Comparative | 1 | 630 | brittle to the springiness much water removed from tofu |
| E | Comparative | 1 | 470 | brittle to the springiness much water removed from tofu |

As is obvious from the above results, according to the process of the present invention, rise in soybean milk viscosity with elapsed time can be effectively inhibited, i.e., the desired delayed coagulation effect can be obtained, and the quality of the tofu thus prepared is also higher than that of those prepared by the comparative examples.

EXAMPLE 2

150 g of water was added to 16.5 g of magnesium chloride and 4.5 g of anhydrous sodium pyrophosphate and the mixture was heated up to 60° C. The mixture was then cooled to 10° C. The so-obtained mixture of coagulant and coagulation delaying agent were added to 3 kg of soybean milk of a temperature of 10° C. prepared by the same procedures as set forth in Example 1, and mixed. 1 minute later, the mixture was homogenized, charged into three containers, sealed and coagulated by heating, by the same procedures as set forth in Example 1 (Samples F to H).

EXAMPLE 3

4.5 g of anhydrous sodium pyrophosphate was added to 3 kg of soybean milk of a temperature of 10° C. which was prepared by the same procedures as set forth in Example 1 and mixed. 16.5 g of magnesium chloride was then added to the mixture thus prepared and 1 minute later, by the same procedures as set forth in Example 1, the mixture was homogenized, charged into three containers, sealed and coagulated by heating (Samples I to K).

Comparative Example 3

A comparative example of tofu charged into a container (Sample L) was prepared by the same procedures as set forth in Example 3 except that the homogenizing treatment was not carried out.

Comparative Example 4

4.5 g of anhydrous sodium pyrophosphate was added to and mixed with 3 kg soybean milk of a temperature of 10° C. prepared by the same procedures as set forth in Example 1 and then, 1 minute later, the mixture was homogenized by the same procedures as set forth in Example 1. Thereafter, 16.5 g of magnesium chloride was added to and mixed with the mixture, and then, by the same procedures as set forth in Example 1, the mixture was homogenized, charged into containers, sealed and coagulated by heating to obtain 2 containers charged with tofu as comparative Examples (Samples M and N).

Comparative Example 5

A comparative example of tofu charged into a container (Sample O) was prepared by the same procedures as set forth in Example 3 except that homogenizing treatment was carried out under a pressure of 25 kg/cm$^2$.

Comparative Example 6

A comparative example of tofu charged into a container (Sample P) was prepared by the same procedures as set forth in Example 2 except that the mixture of coagulant and coagulation delaying agent were added to and mixed with soybean milk, and the homogenizing treatment was carried out 35 minutes later.

The viscosity and the results of sensory tests for the samples obtained above are shown in Table II.

TABLE II

| Sample | | elapsed time (minutes) | viscosity (C.P.) | result of sensory test |
|---|---|---|---|---|
| F | present invention | 5 | 48 | smooth to the palate, no water removed from tofu, springy |
| G | present invention | 15 | 88 | smooth to the palate, no water removed from tofu, springy |
| H | present invention | 30 | 112 | smooth to the palate, no water removed from tofu, springy |
| I | present invention | 5 | 82 | smooth to the palate, no water removed from tofu, springy |
| J | present invention | 15 | 134 | smooth to the palate, no water |
| K | present | 30 | 168 | removed from tofu, springy more or less brittle to the palate, little water removed from tofu |
| L | comparative example | 5 | 314 | brittle to the palate, no springiness, much water removed from tofu |
| M | comparative example | 5 | 186 | brittle to the palate, no springiness, much water removed from tofu |
| N | comparative example | 15 | 246 | brittle to the palate, no springiness, much water removed from tofu |
| O | comparative example | 5 | 302 | brittle to the palate, no springiness, much water removed from tofu |
| P | comparative example | 5 | 243 | brittle to the palate, no springiness, much water removed from tofu |

As is obvious from the above results, where coagulation delaying agent was used together with the coagulant in the process of the present invention, better delayed coagulation effect could be obtained and therefore, transfer of the soybean milk and the charging of the soybean milk into containers could be smoothly carried out. Furthermore, the tofu thus obtained was of high quality.

What is claimed is:

1. A process for preparing tofu charged into a container which comprises forming a mixture by adding a coagulant to a solution selected from the group consisting of soybean milk and aqueous solution of isolated soybean protein; homogenizing the mixture within 30 minutes after addition of the coagulant, under a homogenizing pressure of no less than 30 kg/cm$^2$ by a pressure-type homogenizer; and coagulating the mixture by heating after it has been charged into a packaging container and sealed therein.

2. A process as set forth in claim 1 wherein homogenizing treatment is conducted between 2 seconds and 10 minutes after addition of the coagulant.

3. A process as set forth in claim 1 wherein the homogenizing pressure is 50 to 700 kg/cm$^2$.

4. A process according to claim 3 wherein the coagulent is added to the solution maintained at a temperature between 0° and 25° C. and coagulation of the uncoagulated mixture is performed at a temperature of about 80° to 135° C.

* * * * *